United States Patent
Lin et al.

(10) Patent No.: US 7,066,624 B2
(45) Date of Patent: Jun. 27, 2006

(54) REFLECTOR STRUCTURE IN A LIQUID CRYSTAL DISPLAY AND ITS FABRICATION METHOD

(75) Inventors: Wen-Jian Lin, Hsinchu (TW); Hung-Huei Hsu, Hsinchu (TW); Hong-Da Liu, Chu-Pei (TW)

(73) Assignee: Prime View International Corporation Limited, Hsinchu (TW)

( * ) Notice: Subject to any disclaimer, the term of this patent is extended or adjusted under 35 U.S.C. 154(b) by 163 days.

(21) Appl. No.: 10/641,881

(22) Filed: Aug. 16, 2003

(65) Prior Publication Data

US 2004/0228128 A1 Nov. 18, 2004

(30) Foreign Application Priority Data

May 14, 2003 (TW) ............................... 92113075 A

(51) Int. Cl.
*F21V 7/22* (2006.01)
(52) U.S. Cl. ............... 362/248; 362/341; 362/609; 349/113
(58) Field of Classification Search ................ 362/248, 362/624, 627, 608, 609, 516, 296; 349/110, 349/113, 112, 95, 117, 114, 64
See application file for complete search history.

(56) References Cited

U.S. PATENT DOCUMENTS 6,219,119 B1 * 4/2001 Nakai .......................... 349/113
6,803,980 B1 * 10/2004 Funahata et al. ........... 349/113

* cited by examiner

*Primary Examiner*—Thomas M. Sember
*Assistant Examiner*—Guiyoung Lee

(57) ABSTRACT

A structure of an ultra-micro reflector having abrasive surface with tapered micro bumps and free of resin layer and its fabrication method are provided. The reflector structure comprises mainly a layer of reflector metal, a scattering element with abrasive surface, and a layer of ITO. The abrasive surface has many tapered micro bumps. The reflector structure can be applied to a reflective or partially reflective LCD to achieve optimal performance. It makes the scattering angle of the reflective light source wider and more uniform. The variation of the gap of liquid crystal cells is greatly reduced, so that the reflective efficiency can be kept in an optimal condition. The reflector structure has larger scattering angle, smooth effect, and very good anti-glare effect. The fabrication process of the reflector structure is simple. The material cost for the abrasive surface is inexpensive. The reflector can endure higher temperature than conventional organic reflective elements, because the inorganic thin film process is used.

13 Claims, 6 Drawing Sheets

REFLECTOR STRUCTURE IN A LIQUID CRYSTAL DISPLAY AND ITS FABRICATION METHOD

FIELD OF THE INVENTION

The present invention generally relates to a liquid crystal display (LCD) and a reflector structure, and more specifically to a structure of an ultra-micro reflector (UMR) and to a reflective or partially reflective liquid crystal display having the UMR structure.

BACKGROUND OF THE INVENTION

Most of current reflective and partially reflective thin-film-transistor liquid crystal displays (TFT-LCD) use scattering inner reflector structure. The scattering inner reflector is made by forming a resin layer of abrasive surface using an organic resin process to obtain a better reflective effect. This technique has been disclosed, for example, in a patent of Sharp Co., Japan. FIG. 1 illustrates that the drop height of the scattering abrasive surface 101 directly affects the variation of the design value of Δnd in the liquid crystal cell 107 between two substrates 103 and 105 in a generally current reflector with a resin layer of abrasive surface. As shown in FIG. 1, there is a maximal variation $\Delta nd_j - \Delta nd_i$, where $\Delta n$ represents the variation of the refraction index of liquid crystals, d is the gap of liquid crystal cells, $d_i$ and $d_j$ represent respectively different values of liquid crystal gap in the scattering abrasive surface 101. The more the drop height of the scattering abrasive surface 101 is, the larger the variation is.

The scattering abrasive surface has the following disadvantages. Firstly, the material cost is expensive. Secondly, the drop height of the scattering abrasive surface is very large, about 0.5 μm to 1.5 μm. This affects the alignment of liquid crystals and therefore causes bad optical quality. Moreover, due to the variation of cell gap, the scattering abrasive surface with large drop height will reduce the light reflective efficiency from ideally 100% to 60%~85%. Finally, the heat-resistance of the organic resin is not high. Usually, it is under 250° C. The material is easy to deteriorate at high temperature.

SUMMARY OF THE INVENTION

The present invention has been made to overcome the above-mentioned drawback in conventional reflective or partially reflective liquid crystal displays. An object of the present invention is to provide a structure of an ultra-micro reflector. The structure of an ultra-micro reflector can be used in a reflective or partially reflective liquid crystal display. The structure of an ultra-micro reflector of the present invention comprises mainly a layer of reflector metal, a scattering element with abrasive surface, and a layer of Indium-Tin Oxide (ITO), where the abrasive surface has many tapered micro bumps and each micro bump has a width greater than 0.1 μm and height greater than 10 nm.

According to the present invention, the scattering element has no resin layer and is formed by depositing Si-based inorganic material, such as silicon oxide or silicon nitride, on ITO material. The ripple of the abrasive surface is very tiny. The height of the micro bump is related to the parameters in the fabrication process of the micro bump. The parameters in the fabrication process can be adjusted according to practical needs. Because the scattering element is formed by directly depositing film, it is not affected by the profile pattern on the bottom layer and by the micro lithographic process. Instead, it can get different performances by collocating different material on the bottom layer. For example, three preferred embodiments are: (a) comprising a Si-based layer of thin film with abrasive surface being formed on a flat substrate, (b) comprising a layer of multiple taper-shaped patterns and a Si-based layer of thin film with abrasive surface, and (c) comprising a pattern layer with multiple smooth surfaces and a Si-based layer of thin film with abrasive surface.

Another object of the present invention is to provide a fabrication process for the structure of an ultra-micro reflector. The fabrication process comprises mainly the following steps: (a) preparing a substrate and forming a layer of ITO, (b) forming a layer of thin film with abrasive surface on the ITO by an inorganic thin film process, and forming many tapered micro bumps on the abrasive surface and each micro bump has a width greater than 0.1 μm and height greater than 10 nm, and (c) forming a layer of reflector metal on the abrasive surface of the thin film.

According to the present invention, the formation of the thin film in the inorganic thin film process can use a plasma enhanced chemical vapor deposition (PECVD) or sputter method to make depositing film. The fabrication process of the present invention is simple. Also, because the inorganic thin film process is used, the reflector of the invention can endure higher temperature than conventional organic reflective elements.

Another object of the present invention is to provide a reflective or partially reflective liquid crystal display having the structure of an ultra-micro reflector to achieve optimal performance.

The present invention makes the scattering angle of the reflective light source wider and more uniform. The variation of the gap of liquid crystal cells is greatly reduced, so that the reflective efficiency can be kept in an optimal condition. In terms of scattering effect, the structure of an ultra-micro reflector of the present invention has larger scattering angle, smooth effect, and very good anti-glare effect.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
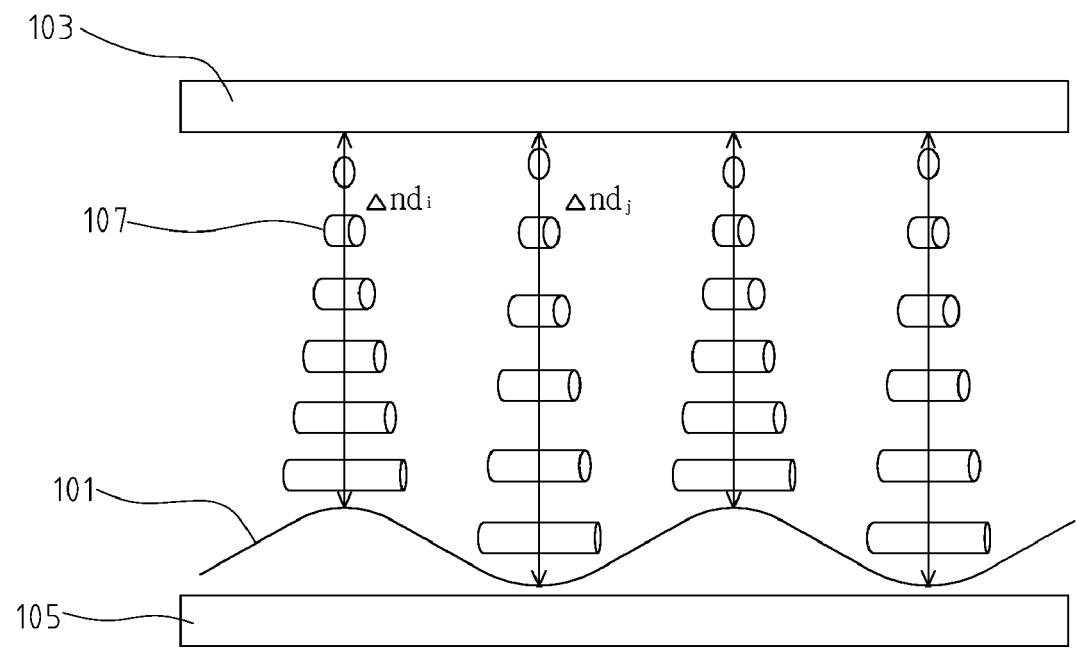
FIG. 1 illustrates that the drop height of the scattering abrasive surface directly affects the variation of the design value of Δnd in the liquid crystal cells between two substrates in a generally current reflector with a resin layer of abrasive surface.
Figure 2A:
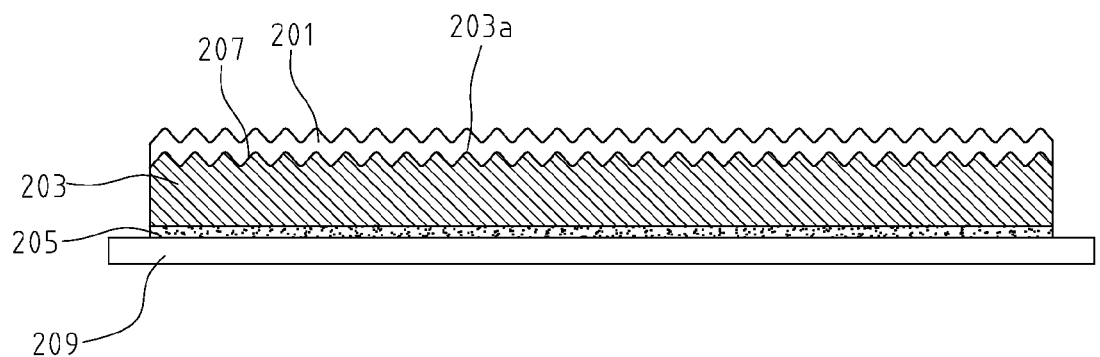
FIG. 2a shows a cross-sectional view of a structure of an ultra-micro reflector according to the present invention.
Figure 2B:
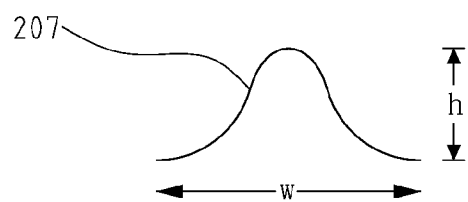
FIG. 2b shows the width and height of each micro bump.

FIG. 2a shows a cross-sectional view of a structure of an ultra-micro reflector according to the present invention. The structure of an ultra-micro reflector of the present invention comprises mainly a layer of reflector metal 201, a scattering element 203 with abrasive surface 203a, and a layer of indium-tin oxide 205. The abrasive surface 203 has many tapered micro bumps 207 and each micro bump has a width w greater than 0.1. μm and a height h greater than 10 nm, as shown in FIG. 2b. The structure of an ultra-micro reflector is designed on a substrate 209, such as a glass substrate The scattering element 203 has no resin layer. Because each micro bump is very tiny and is in nm order, the ripple of the abrasive surface 203a is very tiny. As mentioned above, the height of the micro bump is related to the parameters in the fabrication process of the micro bump. The parameters in the fabrication process can be adjusted according to the actually needs.

The scattering element can have many implemented modes. It can also be collocated with reflective or partially reflective design. The followings illustrate three preferred embodiments of the scattering element and two kinds of collocation with partially reflective design patterns.

Figure 3A:
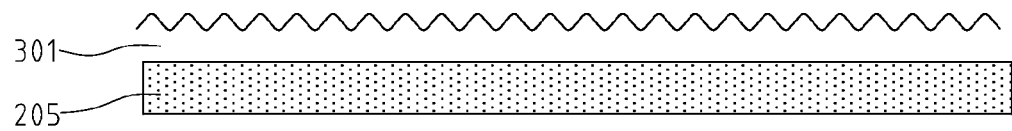
FIG. 3a shows the first preferred embodiment of a scattering element of the invention.
Figure 3B:
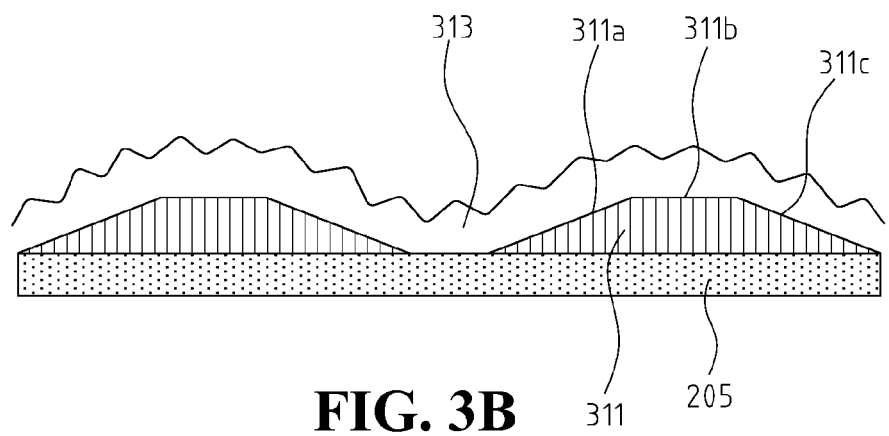
FIG. 3b shows the second preferred embodiment of a scattering element of the invention.

In FIG. 3a, the scattering element comprises a layer of thin film 301 with abrasive surface. In FIG. 3b, the scattering element comprises a layer of multiple taper-shaped patterns 311 and a layer of thin film 313 with abrasive surface. The pattern layer 311 is formed on the ITO 205. The thin film layer 313 is formed on the pattern layer 311 and is changed following the slopes of the taper ramps 311a–311c. The slopes of the taper ramps 311a–311c can be used to control the reflective effect of a specific direction.

Figure 3C:
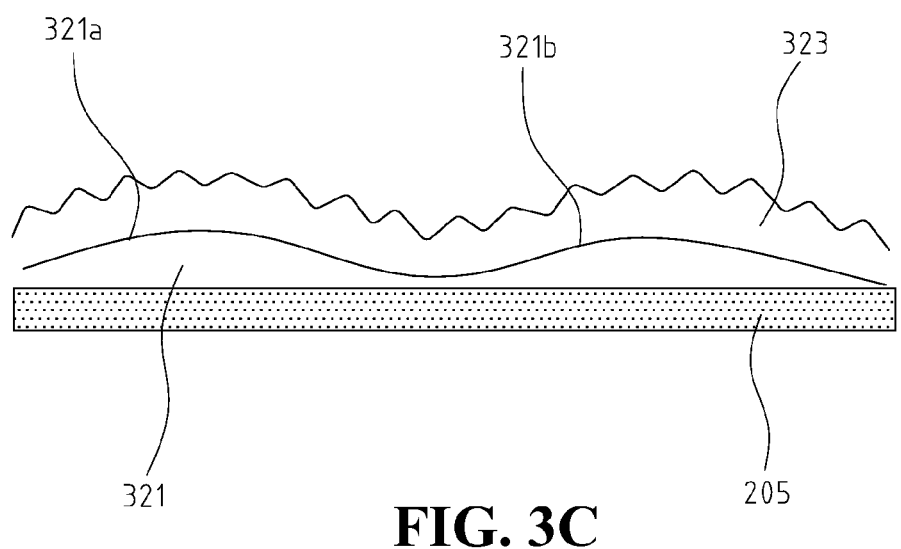
FIG. 3c shows the third preferred embodiment of a scattering element of the invention.

In FIG. 3c, the scattering element comprises a pattern layer 321 with multiple smooth surfaces 321a–321b and a layer of thin film 323 with abrasive surface. The pattern layer 321 is formed on the ITO 205. The thin film layer 323 is formed on the pattern layer 321. It is worthy to mention that the pattern layer 321 with multiple smooth surfaces 321a–321b shown in FIG. 3c can be a conventional resin layer or a layer of inorganic material. The drop height of the abrasive surface can be greatly reduced to the nanometer order. Therefore, this invention still has very good optical performance and effect.

The above-mentioned three embodiment modes of the scattering element can be collocated with reflective or partially reflective design. The followings illustrate the collocation of the scattering element shown in FIG. 3b with partially reflective design to form patterns shown in FIGS. 4a–4b, wherein blank area is the transmissive area T with ITO and may have two kinds of variations or combinational design.

Figure 4A:
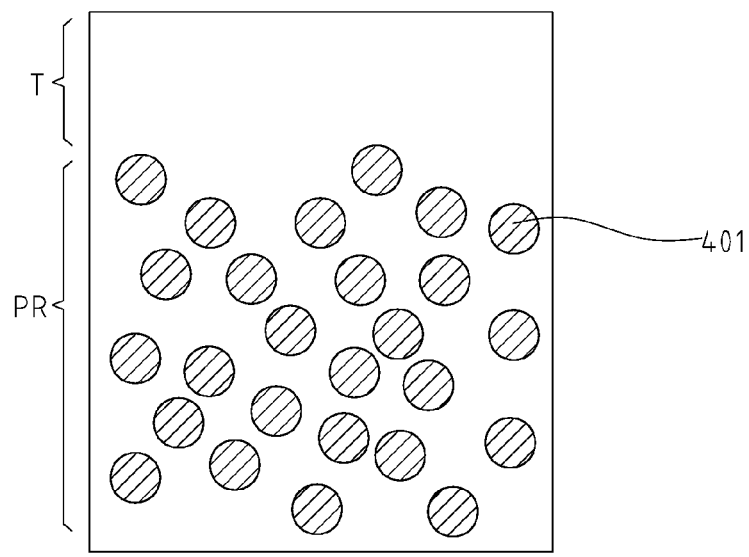
FIG. 4a illustrates a first pattern formed by collocating the scattering element shown in FIG. 3b with partially reflective design.
Figure 4B:
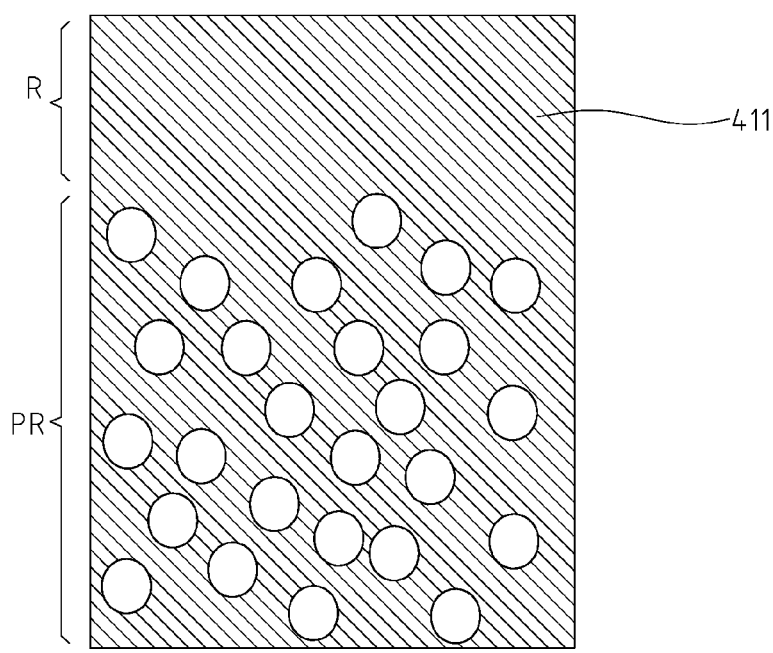
FIG. 4b illustrates another pattern formed by collocating the scattering element shown in FIG. 3b with partially reflective design.

Referring to the pattern shown in FIG. 4a, the layer of multiple taper-shaped patterns is formed on a layer of continuous ITO transparent electrodes and is designed in the metal layers 401 in the partially reflective area PR. These metal layers 401 in the partially reflective area are separated from each other. Referring to the pattern shown in FIG. 4b. the layer of multiple taper-shaped patterns 411 is designed in the metal layers of the partially reflective area PR as well as the reflective area R. In FIG. 4b, the transmissive area T with ITO is separated. In other words, the layer of multiple taper-shaped patterns 411 has many openings in the partially reflective area PR.

The fabrication method of the structure of an ultra-micro reflector of the present invention is simple. It comprises mainly the following steps: (a) preparing a substrate and forming a layer of ITO, (b) forming a layer of thin film with abrasive surface on the ITO by an inorganic thin film process, and forming many tapered micro bumps on the abrasive surface and each micro bump has a width greater than 0.1 μm and height greater than 10 nm, and (c) forming a layer of reflector metal on the abrasive surface of the thin film. A fine reflector is formed according to this method.

According to the present invention, the formation of the thin film in the inorganic thin film process can use a PECVD or sputter method to make depositing film, then change the fabricating parameters, such as RF power, temperature of the depositing film, gas flow, response pressure and response time, and finally deposit or sputter a Si-based, such as SiN or SiO, thin film onto the ITO layer to form the abrasive surface. The fabricating parameters mentioned above can be adjusted to get various sized abrasive surface. The fabrication process of the present invention is simple. The material cost for the abrasive surface is inexpensive. In addition, because the inorganic thin film process is used, the reflector of the invention can endure higher temperature than conventional organic reflective elements. The heat-resistant for the reflector of the invention is above 300° C. while the heat-resistant for the conventional organic reflective elements is below 250° C. The material for the reflector metal can be Al, Ag or their alloy. The material for the thin film can be Si-based inorganic material, such as silicon oxide (SiOx) or silicon nitride (SiNx).

Figure 5:
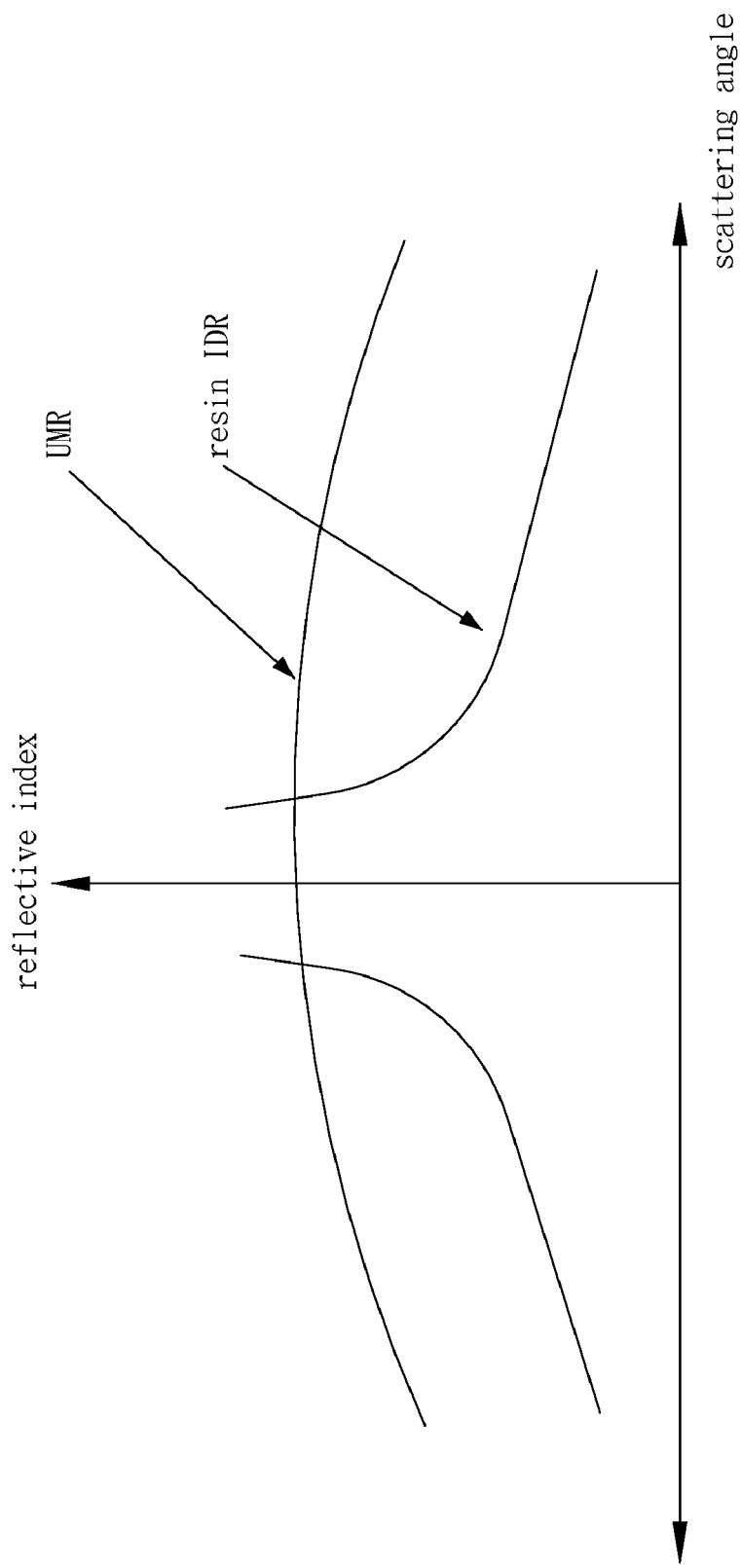
FIG. 5 shows the scattering effects of the structure of an ultra-micro reflector of the present invention versus a conventional scattering inner reflector.

In terms of scattering effect, the structure of an ultra-micro reflector of the present invention has larger scattering angle and smooth effect than conventional scattering inner reflector. In other words, the reflective index does not change violently by the viewing angle. FIG. 5 shows the scattering effects of the structure of an ultra-micro reflector of the present invention versus the conventional scattering inner reflector, where the vertical axis represents the reflective index and the horizontal axis represents the scattering angle. Curve "UMR" illustrates the scattering effect of the structure of an ultra-micro reflector of the present invention. Curve "resin IDR" illustrates the scattering effect of the conventional scattering inner reflector having a resin layer of abrasive surface. As shown in FIG. 5, the reflective index of the structure of an ultra-micro reflector of the present invention does not change violently by the viewing angle.

Figure 6:
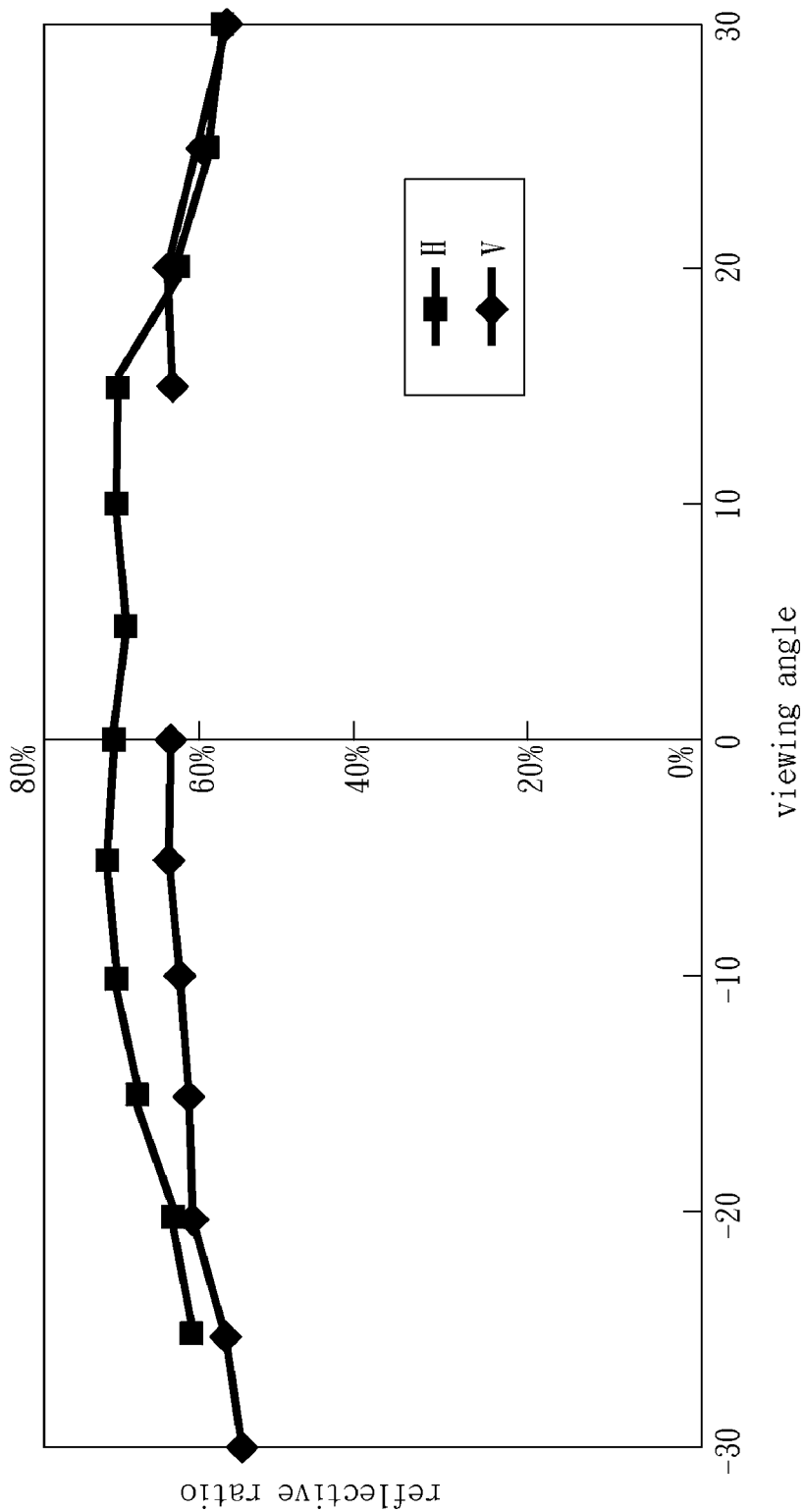
FIG. 6 shows that the structure of an ultra-micro reflector of the present invention has very good anti-glare effect.

FIG. 6 shows that the reflective index of the structure of an ultra-micro reflector of the present invention does not change violently by the viewing angle, that is, this invention has very good anti-glare effect. The vertical axis represents the reflective ratio and the horizontal axis represents the viewing angle. As shown in FIG. 6, curve H is the reflective ratio when the viewing angle is at the horizontal direction and curve V is the reflective ratio when the viewing angle is at the vertical direction.

In summary, the present invention provides a structure of an ultra-micro reflector having abrasive surface with tapered micro bumps and free of resin layer and its fabrication method. The abrasive surface is fabricated by high heat-resistant and inexpensive material. In preferred embodiments, Si-based thin film process can use a PECVD or sputter method to make depositing film. The fabrication process is simple. The structure of an ultra-micro reflector can be applied to a reflective or partially reflective liquid crystal display to achieve optimal performance. It makes the scattering angle of the reflective light source wider and more uniform. The variation of the gap of liquid crystal cells is greatly reduced, so that the reflective efficiency can be kept in the optimal condition. In terms of scattering effect, the structure of an ultra-micro reflector of the present invention has larger scattering angle, smooth effect, and very good anti-glare effect.

Although the present invention has been described with reference to the preferred embodiments, it should be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A reflector structure in a liquid crystal display, comprising:
    a layer of reflector metal;
    a scattering element including a Si-based layer of thin film with abrasive surface, and being formed under said layer of reflector metal, said abrasive surface having a plurality of tapered micro bumps; and
    a layer of indium-tin oxide (ITO), being formed under said scattering element;
    wherein said reflector structure is applied to a reflective or partially reflective liquid crystal display.

2. The reflector structure in a liquid crystal display as claimed in claim 1, said scattering element with abrasive surface further including a layer of multiple taper-shaped patterns formed on said layer of indium-tin oxide and underneath said Si-based layer of thin film with abrasive surface, said Si-based layer following slopes of said taper-shaped patterns.

3. The reflector structure in a liquid crystal display as claimed in claim 1, said scattering element with abrasive surface further including a layer of multiple smooth surfaces formed on said layer of indium-tin oxide and underneath said Si-based layer of thin film with abrasive surface, said Si-based layer following slopes of said smooth surfaces.

4. The reflector structure in a liquid crystal display as claimed in claim 2, said reflector structure being applied to a partially reflective liquid crystal display which has reflective and partially reflective areas, said layer of patterns being designed in metal layers of the partially reflective area as well as the reflective area, and having at least one opening in the partially reflective area.

5. The reflector structure in a liquid crystal display as claimed in claim 2, said reflector structure being applied to a partially reflective liquid crystal display which has reflective and partially reflective areas, said layer of patterns being designed in metal layers of the partially reflective area and separated from each other in the partially reflective area.

6. The reflector structure in a liquid crystal display as claimed in claim 2, said reflector structure being applied to a partially reflective liquid crystal display which has transmissive and partially reflective areas, said layer of patterns having at least one opening in the transmissive area with said ITO, and said layer of patterns being separated from each other in the partially reflective area.

7. A fabrication method of a reflector structure in a liquid crystal display, comprising the steps of:
    (a) preparing a substrate and forming a layer of ITO on said substrate;
    (b) forming a layer of Si-based thin film with abrasive surface on said ITO by an inorganic thin film process, and forming a plurality of tapered micro bumps on said abrasive surface; and
    (c) forming a layer of reflector metal on the abrasive surface of said thin film.

8. The fabrication method of a reflector structure in a liquid crystal display as claimed in claim 7, wherein the inorganic thin film process in said step (b) includes the following steps:
    (b1) using a deposit or sputter method to make depositing film; and
    (b2) changing fabricating parameters, depositing or sputtering a Si-based thin film onto said ITO layer to form said abrasive surface.

9. The fabrication method of a reflector structure in a liquid crystal display as claimed in claim 8, wherein the fabricating parameters in said step (b2) includes at least temperature of the depositing film, gas flow, response pressure and response time.

10. The fabrication method of a reflector structure in a liquid crystal display as claimed in claim 9, wherein the formation of said depositing film uses a plasma enhanced chemical vapor deposition method to make depositing film, said fabricating parameters further include RF power.

11. The fabrication method of a reflector structure in a liquid crystal display as claimed in claim 7, the material for said reflector metal being Al, Ag or their alloy.

12. A reflective liquid crystal display including the reflector structure as claimed in claim 1.

13. A partially reflective liquid crystal display including the reflector structure as claimed in claim 1.

* * * * *